(12) United States Patent
McCarty et al.

(10) Patent No.: US 6,202,491 B1
(45) Date of Patent: *Mar. 20, 2001

(54) DIGITAL VIBRATION COUPLING STUD

(75) Inventors: William A. McCarty, San Diego; Stephan L. Thompson, Escondido, both of CA (US)

(73) Assignee: SKF Condition Monitoring, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,068

(22) Filed: Oct. 23, 1998

Related U.S. Application Data

(63) Continuation-in-part of application No. 08/898,485, filed on Jul. 22, 1997, now Pat. No. 5,992,237.

(51) Int. Cl.⁷ .................................................. G01H 11/08

(52) U.S. Cl. .................................. 73/659; 73/593; 702/56

(58) Field of Search ............................. 73/659, 660, 661, 73/593; 702/56, 77; 340/683

(56) References Cited

U.S. PATENT DOCUMENTS

| | | | |
|---|---|---|---|
| 3,848,112 | 11/1974 | Weichselbaum et al. | 235/61.7 R |
| 3,913,084 | 10/1975 | Bollinger et al. | 340/261 |
| 4,121,574 | 10/1978 | Lester | 128/2.05 R |
| 4,280,185 | 7/1981 | Martin | 364/506 |
| 4,408,285 | 10/1983 | Sisson et al. | 364/508 |
| 4,426,641 | 1/1984 | Kurihara et al. | 340/683 |
| 4,520,674 | 6/1985 | Canada et al. | 73/660 |
| 4,530,240 | 7/1985 | Board et al. | 73/593 |
| 4,550,311 | 10/1985 | Galloway et al. | 340/531 |
| 4,612,620 | 9/1986 | Davis et al. | 364/551 |
| 4,615,216 | 10/1986 | Vykoupil | 73/593 |
| 4,621,263 | 11/1986 | Takenaka et al. | 340/870.7 |
| 4,669,315 | 6/1987 | Sato et al. | 73/660 |
| 4,721,849 | 1/1988 | Davis et al. | 235/472 |
| 4,768,380 | 9/1988 | Vermeiren et al. | 73/593 |
| 4,800,512 | 1/1989 | Busch | 364/551.01 |
| 4,823,602 | * 4/1989 | Christensen, Jr. | 73/661 |
| 4,827,771 | 5/1989 | Cary et al. | 73/644 |
| 4,885,707 | 12/1989 | Nichol et al. | 364/551.01 |
| 5,191,327 | 3/1993 | Talmadge et al. | 340/870.38 |
| 5,206,818 | 4/1993 | Speranza | 364/550 |
| 5,251,151 | 10/1993 | Demjaenko et al. | 364/550 |

(List continued on next page.)

FOREIGN PATENT DOCUMENTS

| | | |
|---|---|---|
| 44 27 880 A1 | 2/1996 | (DE) . |
| 021121B1 | 8/1991 | (EP) . |
| 57126325 | 8/1982 | (JP) . |
| 57139628 | 8/1982 | (JP) . |
| WO 95/00930 | 1/1995 | (WO) . |
| WO 98/01831 | 1/1995 | (WO) . |
| WO 98/01831 | 1/1998 | (WO) . |

OTHER PUBLICATIONS

Symbol; PPT 4600 Series Portable Pen Terminals with Integrated Scanners; Apr. 1996,; 6 pages.

Dallas Semiconductor; DS2430A 256–Bit 1–Wire EEPROM; Apr. 3, 1995; pp. 235–250.

* cited by examiner

Primary Examiner—Hezron Williams
Assistant Examiner—Rose M. Miller
(74) Attorney, Agent, or Firm—Knobbe, Martens, Olson & Bear, LLP

(57) ABSTRACT

A vibration coupling stud for use in a vibration monitoring system includes digital memory and temperature sensing devices. Data is transferred between the vibration coupling stud and a vibration monitor. Data stored in the stud may include measuring point identification, prior measurement data, machine or bearing part numbers, and alarm limits.

22 Claims, 14 Drawing Sheets

U.S. PATENT DOCUMENTS

| | | | |
|---|---|---|---|
| 5,257,208 | 10/1993 | Brown et al. | 364/510 |
| 5,319,962 | 6/1994 | Kaminski et al. | 73/116 |
| 5,335,186 | 8/1994 | Tarrant | 364/550 |
| 5,350,040 * | 9/1994 | Gribble | 184/105.2 |
| 5,379,643 | 1/1995 | Taylor | 73/654 |
| 5,430,663 | 7/1995 | Judd et al. | 364/550 |
| 5,479,359 | 12/1995 | Rogero et al. | 364/96 |
| 5,501,105 | 3/1996 | Hernandez et al. | 73/660 |
| 5,511,422 | 4/1996 | Hernandez et al. | 73/593 |
| 5,530,343 | 6/1996 | Bowers, II et al. | 324/173 |
| 5,533,413 | 7/1996 | Kobayashi et al. | 73/865.9 |
| 5,539,252 * | 7/1996 | Brorby | 257/678 |
| 5,544,073 | 8/1996 | Piety et al. | 364/508 |
| 5,555,457 | 9/1996 | Campbell et al. | 340/840.17 |
| 5,579,241 | 11/1996 | Corby, Jr. et al. | 364/550 |
| 5,584,796 | 12/1996 | Cohen | 600/201 |
| 5,586,305 | 12/1996 | Edison et al. | 395/500 |
| 5,615,130 * | 3/1997 | Bolan et al. | 364/505 |
| 5,691,707 * | 11/1997 | Smith et al. | 340/682 |
| 5,691,904 * | 11/1997 | Lysen | 364/460 |
| 5,808,903 * | 9/1998 | Schlitz et al. | 364/508 |
| 5,852,351 * | 12/1998 | Canada et al. | 318/490 |
| 5,955,670 * | 9/1999 | Goodman et al. | 73/592 |
| 5,992,237 * | 11/1999 | McCarty et al. | 73/659 |
| 6,006,164 * | 12/1999 | McCarty et al. | 702/56 |

DIGITAL VIBRATION COUPLING STUD

RELATED APPLICATIONS

This application claims priority to and is a continuation-in-part of U.S. application Ser. No. 08/898,485 also entitled "Digital Vibration Coupling Stud," and filed on Jul. 22, 1997, now U.S. Pat. No. 5,992,237. The disclosure of application Ser. No. 08/898,485 is hereby incorporated by reference in its entirety.

BACKGROUND OF THE INVENTION

I. Field of the Invention

The present invention relates to apparatus for the detection of bearing and other malfunctions in machinery. More specifically, the present invention relates to portable vibration monitors and vibration coupling studs for monitoring the vibrational and other characteristics of the machine.

II. Description of the Related Art

In order to properly maintain machinery used in manufacturing facilities, power generating stations, etc., it has become common to employ vibration monitoring equipment to detect variations in the vibration characteristics of the machinery while they are operating. This assists in the determination of appropriate intervals for machine maintenance, and as a warning of imminent machine failure. It can be appreciated that proper scheduling of maintenance can improve the operating efficiency of the facility, and that a warning of imminent machine failure can avoid catastrophic machine damage as well as danger to facility personnel.

Many systems have been developed to implement such a monitoring procedure. In some systems, as described in U.S. Pat. No. 5,430,663 to Judd et al., for example, transducers are fixed to machinery throughout a plant or other facility, and the electrical signals from the transducers are wired to a central computer system for monitoring. Another system of this nature is described in U.S. Pat. No. 5,191,327 to Talmadge et al. In the system described by Talmadge, the analog transducer signal is pre-processed with programmable filtering circuitry located within the transducer housing. The central computer of the Talmadge et al. system can both store and retrieve transducer ID data and instructions directing signal pre-processing into and out of a memory located within the transducer housing at the measuring point.

Systems of this design have the advantage that all points of interest in the plant can be continuously and simultaneously monitored. However, such a system is expensive to implement, requiring a large number of dedicated vibration transducers as well as interconnecting wiring strung throughout the facility. Accordingly, such implementations are most useful in situations where machine failure may have especially serious consequences, such as in a nuclear power plant for example.

A less expensive alternative to such a system uses a portable monitoring probe having an internal trasducer and signal processing circuitry. A system such as this is described in U.S. Pat. No. 4,520,674 to Canada et al. In systems of this design, plant personnel will walk a generally predetermined route around a facility being monitored in order to apply a portable data collection device to measuring points at various locations on the machinery to be monitored. In the Canada et al. patent, for example, a technician carries a handheld probe which is connected to a separate portable data collection and processing device. One portion of the handheld probe is placed either in direct contact with the outside of the machine to be monitored, or in direct contact with a vibration coupling stud secured to the outside of the machine to be monitored. Mechanical vibration is thus coupled to an internal piezoelectric vibration transducer for creating an electrical signal indicative of the vibratory acceleration of the machine being monitored. The handheld probe then outputs an analog vibration signal to a separate data collection and processing device. Vibration parameters such as acceleration and velocity are calculated and stored for later analysis.

A commercially available device of this nature is the Picolog (TM) from SKF Condition Monitoring of San Diego, Calif. The Picolog system comprises a handheld probe capable of measuring and storing hundreds of separate vibration level measurements. These measurements are later uploaded to a host computer system for analysis. The Picolog (TM), however, does not provide a real-time output of the vibration measurement.

Although these systems are relatively inexpensive, they have several disadvantages. One fundamental disadvantage is that the technician must accurately record where and when each vibration measurement is taken. Although a specific route which is followed by all technicians when gathering vibration data may be established, but this increases the required training, and some transcriptional or other route errors are essentially inevitable.

Although some devices have been designed to alleviate this problem, significant potential for improvement remains. A system described in U.S. Pat. No. 4,800,512 to Busch discloses a vibration data measuring probe which can read a measuring point code from a vibration coupling stud located at a particular measuring point. The coupling stud of this system includes a unique identifier such as a bar code, a specific arrangement of magnets, a ridge pattern, or other similar identifying characteristic. When the portable probe is applied to the coupling stud, a reader slides along the bar code, magnets, ridges, etc., thereby creating a signal which is transferred to a computer attached to the probe. This system is stated to allow the computer to identify the coupling stud the probe is attached to, thereby reducing or eliminating the need to manually transcribe information regarding the data point. However, the amount of information storable in the vibration coupling stud is very limited, and the probe required to read the code is mechanically complex.

What is needed in the art is therefore a vibration data collection system which incorporates increased capabilities for data storage at the measuring point, which is easy to use, and which is inexpensive to manufacture.

SUMMARY OF THE INVENTION

In one embodiment, the invention comprises a vibration coupling stud having a body comprising an internal recess. The recess may have an electronic circuit element captured therein such that the body substantially surrounds the circuit element. In some embodiments, the stud comprises first and second engageable portions which clamp the circuit element in the recess when the portions are engaged. Another aspect of the invention is a method of making vibration coupling studs which may comprise forming a recess in a first body portion, placing an electronic circuit element in the recess, and engaging a second body portion to the recess over the electronic circuit element.

DETAILED DESCRIPTION OF THE PREFERRED EMBODIMENT

Preferred embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
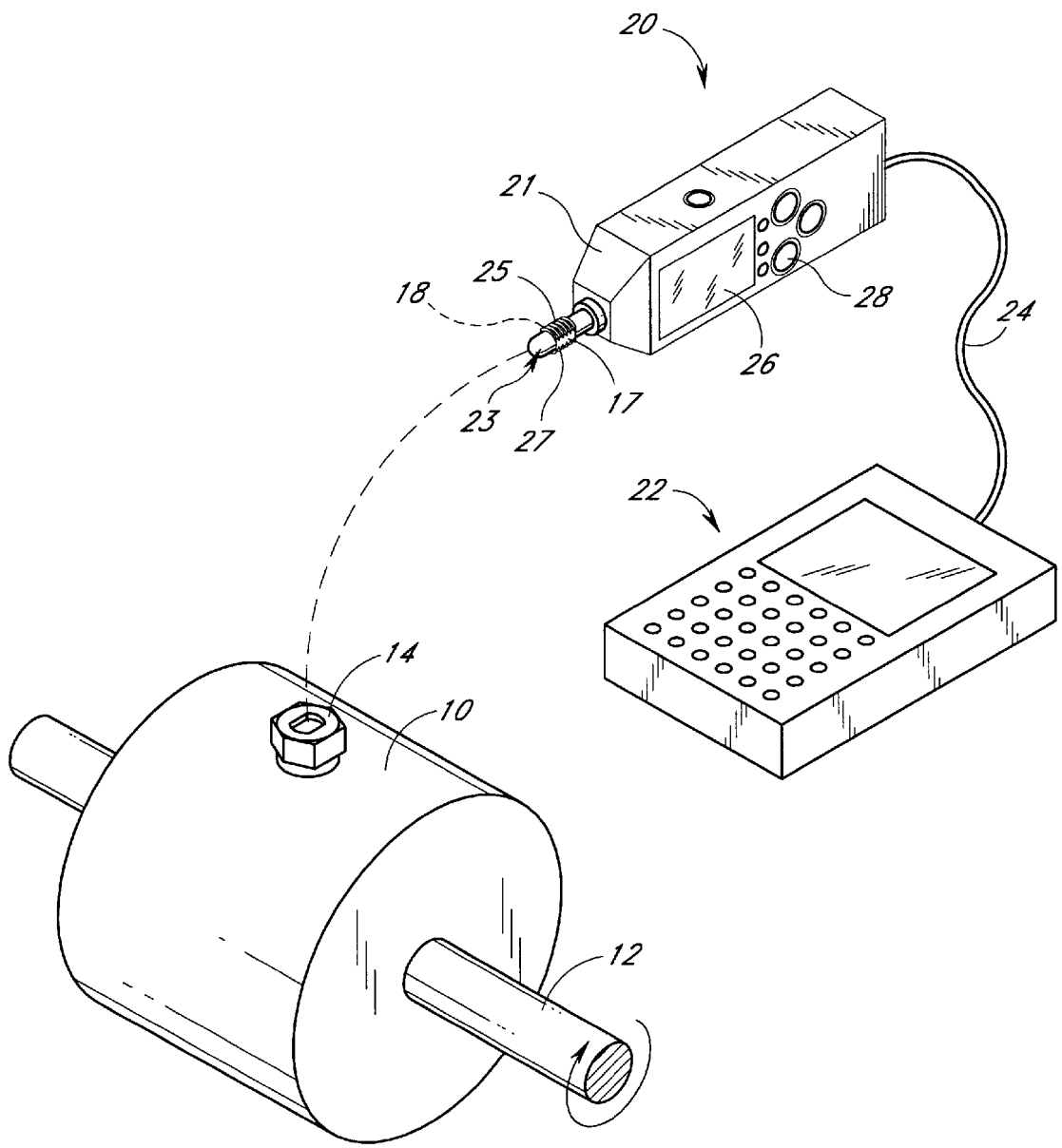
FIG. 1 is a perspective view of a portable vibration monitoring system in accordance with a preferred embodiment of the present invention.

FIG. 1 illustrates major components of one embodiment of the present invention as well as illustrating its most common environment of use. Accordingly, FIG. 1 shows a portion of a machine which incorporates a rotating shaft 12 mounted inside a ball bearing, journal bearing, or the like. The bearing may be mounted in a bearing housing 10. The rotating components of the machine, such as the shaft 12 mentioned above, produce characteristic vibrations of the bearing housing 10 and the machine as a whole which are communicated to a vibration coupling stud 14 which is secured to the bearing housing 10 or the machine enclosure, typically with a threaded connection into the machine enclosure or into the bearing housing 10 which is part of the overall machine.

It will be appreciated that the machine may be any type of vibrating device, including a turbine, pump, fan, or the like. As mentioned above, the vibration coupling stud 14 may be secured to a machine enclosure or other integral part, thereby coupling vibrations of an entire machine to a vibration monitoring system. Alternatively, in some embodiments of the present invention, one or more vibration coupling studs 14 are secured to a housing 10 for an individual bearing so that the vibration characteristics of shaft rotation within the single bearing may be examined and individual bearing condition therefore monitored as well. In these and similar cases, an individual bearing may be considered a portion of a machine, or may itself be considered a machine which is being monitored. The use of the word "machine" in this disclosure is thus intended to cover any device for which condition monitoring is advantageous, and is not intended to be limited to specific locations or specific types of apparatus.

The vibration coupling stud 14 provides a location which is adapted to accept a probe 23 with an end extending from a portable vibration monitor 20, which is illustrated in FIG. 1 as being compact enough to be handheld, although this is not required for portability. As can be seen in FIG. 1, a portion of the probe 23 is external to the housing 21 of the handheld vibration monitor 20. As will also be discussed below with reference to FIGS. 7 and 10, the probe 23 may comprise opposed flat sides 17, 18 and opposed threaded surfaces 25, 27 to allow for the establishment of a consistent mechanical coupling between the probe and the stud 14 via a ¼ turn threaded engagement. As will be seen below with reference to FIGS. 4 through 6, a variety of different connection formats are possible, although certain configurations have characteristics which are especially desirable.

In the embodiment of FIG. 1, the handheld vibration monitor 20 includes a vibration transducer (illustrated in the partial cutaway view of FIG. 4), typically a piezoelectric crystal, which is in mechanical contact with a portion of the probe 23 inside the housing 21 of the handheld vibration monitor 20. When the probe 23 is held in contact with the vibration coupling stud 14, the vibration is mechanically transferred to the transducer inside the housing 21 to produce an electrical signal for analysis. As will be described below, a portion of this analysis may be performed within the handheld vibration monitor 20, and additional analysis may be performed on a device external to the vibration monitor 20, such as an associated palm-top data processor or computer 22, which communicates with the handheld vibration monitor 20 over a communication link 24. The handheld vibration monitor 20 additionally may comprise a display 26, and a keypad 28 for direct user interface and control. It may be noted that in some embodiments of the vibration monitoring system herein described the palm-top data processor 22 may or may not be used with the handheld vibration monitor 20. As a stand-alone device, the handheld vibration monitor 20 may be configured to at least perform the data analysis necessary to compare the received vibration signal with alarm limits. When the palm-top computer is provided, data transfer between the palm-top computer 22 and the handheld vibration monitor 20 can occur as will be described below, and more sophisticated data storage and analysis can be performed.

In some advantageous embodiments which include the palm-top computer 22, signal processing performed inside the handheld vibration monitor 20 produces vibration data of various types in digital form. This digital data can then be communicated to the palm-top computer 22 using established communication protocols such as RS-232, RS-422, etc. which are well known to those of skill in the art, and which commercially available palm top computers are already adapted to receive and transmit. Although illustrated as a physical cable in FIG. 1, it will be appreciated that the communication link 24 may also utilize wireless methods such as infrared or RF based communication links. The palm-top data processor 22 may comprise a standard portable computing device available from several sources. The palm-top data processor may, for example, be a DOS or Windows (TM) based personal computer, and may advantageously include a keypad and/or a pen based user interface. In accordance with the above, the palm-top computer also preferably incorporates an RS-232 or other standard I/O interface for communicating with the handheld vibration monitor 20. With this configuration, no specialized communication hardware needs to be incorporated into the palm-top computer 22, and a large variety of currently available industry standard computers may be appropriately programmed to function as the palm-top computer 22 of the present vibration monitoring system.

The palm-top computer 22 is also preferably suitable for use in industrial environments involving rough handling, and possibly even the presence of explosive gases. Palm-top computers which are suitable for use in the system of FIG. 1 are commercially available, for example, as the PPT 4600 Series from Symbol Technologies of Holtsville, N.Y.

Figure 2A:
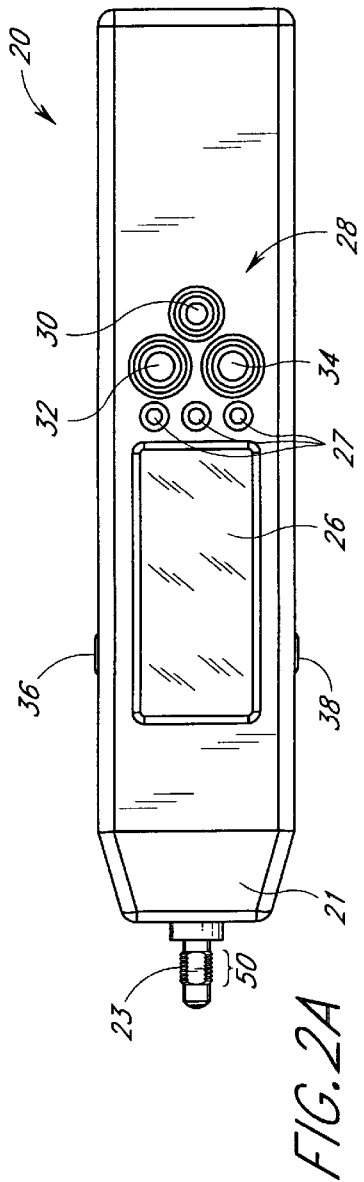
FIG. 2A is side view of the handheld portion of the portable vibration monitoring system of FIG. 1.
Figure 2B:
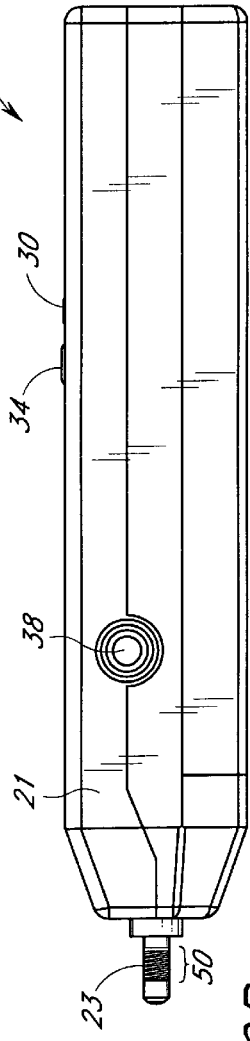
FIG. 2B is a top view of the handheld monitor of FIG. 2A.
Figure 2D:
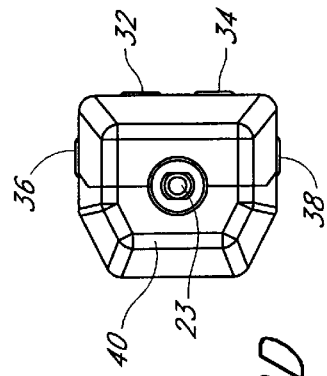
FIG. 2D is a front view of the handheld monitor of FIG. 2A.

In FIGS. 2a through 2d, several views of an advantageous handheld vibration monitor are presented. Referring now to FIGS. 2a and 2b, the handheld vibration monitor 20 is shown in side view and top view respectively, illustrating the display 26 and keypad 28 on the housing 21 in FIG. 2a. In addition to the display, which advantageously comprises an LCD display, several different color alarm LEDs 27 may also be provided. The keypad 28 may include three separate function keys. One key 30, preferably comprises an "ON/OFF" key for unit activation. A second "BACKLIGHT" key 32 turns a display backlight on and off. A "DISPLAY" key 34 allows the user to scroll through several alternate displays, such as a display of the value currently being measured, a display of current alarm setpoints, or a display of current danger setpoints.

In some embodiments of the present invention, two "TAKE DATA" buttons 36, 38 are provided on the housing. The two "TAKE DATA" keys may be provided on opposite surfaces of the housing 21 at the same location along the length of the handheld vibration monitor 20. Both of these buttons have identical functionality. As will be explained below in more detail in conjunction with FIG. 14, actuation of either "TAKE DATA" key will initiate the processing of the electrical signal produced by the internal transducer.

Measured vibration signal characteristics such as velocity, acceleration, enveloped acceleration, or other calculated vibration measurement values can then be presented on the display or output to the palm-top computer 22. The housing 21 may be formed to comprise an outward bulge 40 extending along the side opposite the display 26. With this housing 21 shape and "TAKE DATA" key 36, 38 placement, a user may hold the vibration monitor 20 in either the left or right hand, and with the bulge 40 resting in the palm of the hand, the user's left or right thumb rests comfortably over one or the other "TAKE DATA" key 36, 38.

Figure 2C:
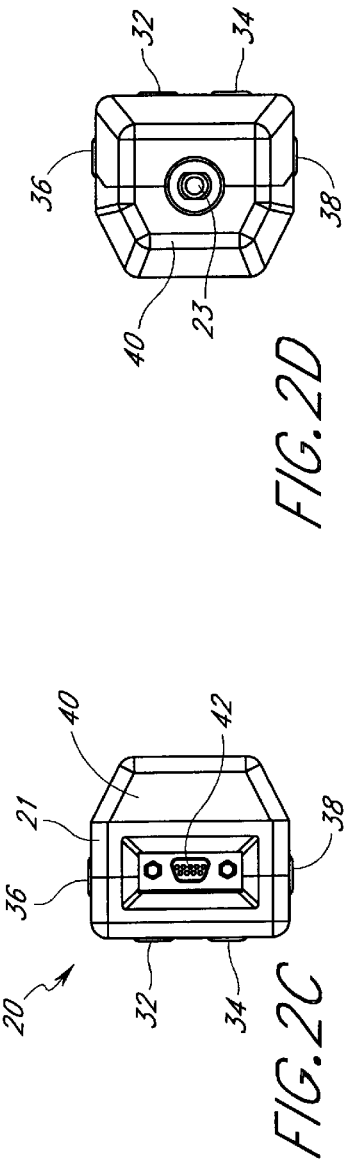
FIG. 2C is a rear view of the handheld monitor of FIG. 2A.

As is illustrated in the rear view of FIG. 2c, the handheld vibration monitor 20 may also comprise a communication port 42 for interfacing with the palm-top computer 22 described above. In the embodiment illustrated in FIG. 2, the communication port comprises a 9 pin D-subminiature connector well known to those of skill in the art and which is often used in the standard serial RS-232 digital data communication protocol.

Figure 3:
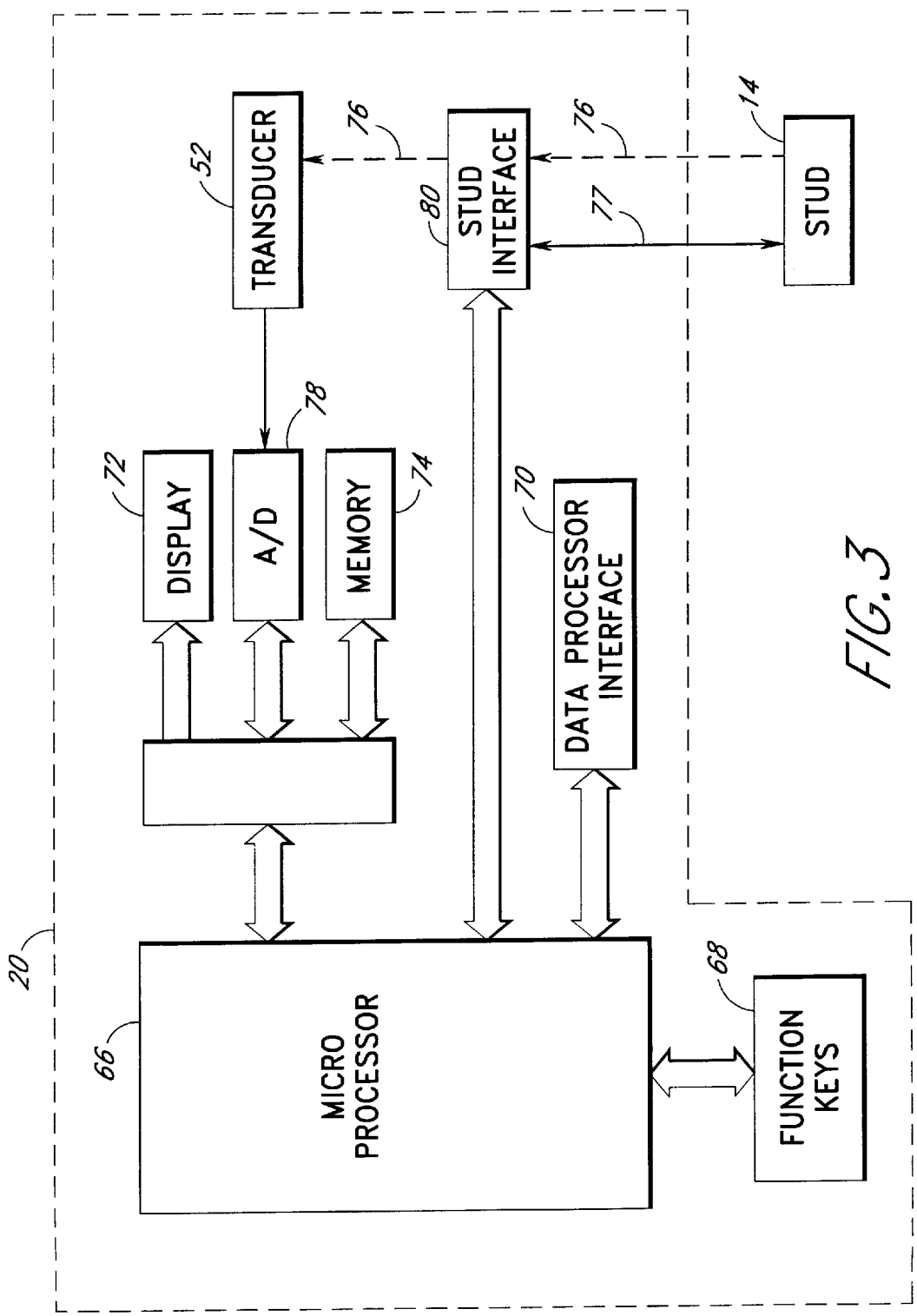
FIG. 3 is a block diagram of a portion of the internal circuitry of the handheld vibration monitor of FIG. 2A.
Figure 4:
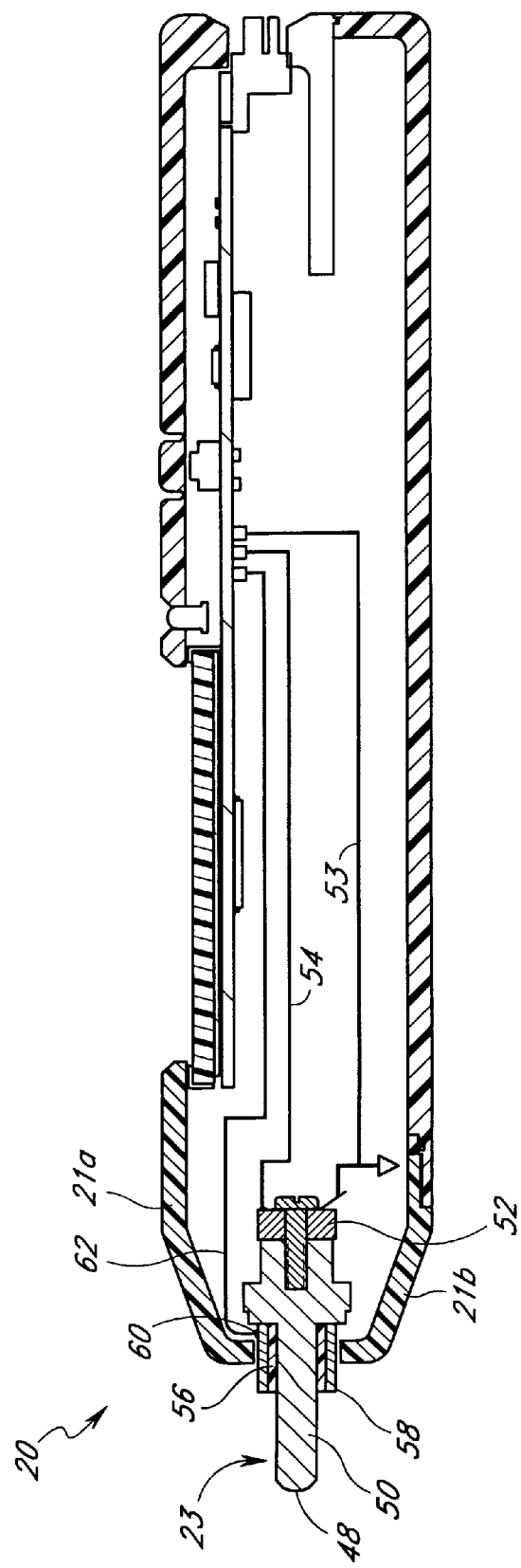
FIG. 4 is a cutaway side view of the handheld probe of FIG. 2A, illustrating the transducer and contact portions of the handheld vibration monitor.

FIG. 3 shows a block diagram of the processing circuitry inside one embodiment of the handheld vibration monitor 20, as well as the mechanical and electrical interface between the stud 14 and the monitor 20. The central component is a microprocessor 66 which controls the monitor 20 function and performs some or all of the data processing on the vibration signal received from the machine being monitored. The circuitry includes a function key interface 68, and an I/O interface 70 for communication with an external data processor such as the palm-top computer 22 discussed above. Display driver circuitry 72 and memory 74 are also coupled to the microprocessor 66, either via two separate buses or, as shown in FIG. 4, via a shared bus. The memory 74 is preferably at least partially non-volatile, and stores information such as alarm limits, and the current date and time. Also preferably stored in the memory is a bearing severity matrix which comprises a table correlating a list of bearing types, a code for particular bearing or machine configurations, unique measuring point identifiers, or other identification data with appropriate alarm and danger vibration levels. With a stored matrix of this sort, a given numerical vibration measurement may produce a different alarm status depending on the point at which the measurement is taken. Also important is the stud interface 80, which provides electrical and mechanical communication between the stud 14 and the monitor 20.

The microprocessor receives signals from the stud 14 via two different routes. The first is via a mechanical coupling 76 between the stud 14 and the transducer 52 which is mediated by the mechanical coupling features of the stud interface 80. The output of the transducer may be filtered by analog anti-aliasing or other filters and is then sampled and digitized by an analog to digital converter 78 to produce a series of digital samples defined by the analog output of the transducer. The analog to digital converter 78 transmits the samples to the microprocessor 66 for calculations of acceleration or velocity amplitudes, as well as other characteristics of the vibration signal from the machine being monitored. Specific vibrational signatures indicative of bearing wear or malfunction, such as enveloped acceleration measurements, can also be observed and their presence and/or degree can be communicated to the user either with the display 26 or via the communication link to the palm-top computer 22. In some advantageous embodiments, the microprocessor 66 calculates a discrete frequency spectrum of the incoming digital samples. The results of this calculation can be used to calculate various vibrational parameters inside the monitor 20, or they may be communicated to the palm-top computer 22 for analysis. If desired, sampled values output from the analog to digital converter 78 can be transmitted to the palm-top computer 22 in real time as the vibration measurement is being made.

The stud interface 80 also forms an electrical coupling 77 between the processor 66 with memory and/or other circuitry embedded in the stud 14. As will be seen below, the design of this electrical coupling is advantageously as illustrated in one of the embodiments illustrated in FIGS. 4–13. Through this interface 80, the handheld vibration monitor 20 can retrieve data stored in such stud mounted memory ICs. This data may include bearing type, measuring point identification, a code indicating bearing configuration, known bearing defect frequencies, a baseline vibration reading, previously taken vibration measurements along with the time and/or date the measurement was taken, stored alarm limits, as well as other types of data described more fully below with reference to the stud 14 itself. Also, when used with an appropriately configured vibration coupling stud 14, the handheld vibration monitor 20 can transmit data via the stud interface 80 to the vibration coupling stud 14, such as measured vibration characteristics, revised alarm limits, a severity matrix relevant to the measuring point, etc.

Referring now to FIG. 4, a cutaway view of one embodiment of the handheld vibration monitor 20 is shown. Held in place between two halves 21a, 21b of the monitor housing 21 is the probe 23. In this embodiment, the probe 23 comprises a body which may advantageously include a rounded tip 48 at an end extending out from the housing 21. This tip 48 makes physical contact with a portion of the vibration coupling stud 14 to couple mechanical vibrations from the machine to the handheld vibration monitor 20. The probe 23 may also comprise a ¼ turn threaded portion 50 (also illustrated in FIGS. 2A and 2B, and comprising threaded sections 25 and 27 illustrated in FIG. 1) intermediate between the tip 48 and the probe 23 entry point into the housing 21. The threaded portion 50 is preferably configured to mate with a threaded portion of the vibration coupling stud 14, as will be explained in detail below with reference to FIG. 12. The threaded section 50 also preferably is of a double-start configuration, such that the threaded surfaces 25, 27 engage identically with the stud, which results in a ¼ turn engagement regardless of the initial orientation of the probe 23 when it is placed in contact with the stud 14.

Inside the housing 21, the other end of the probe 23 is mechanically coupled to the vibration transducer 52. As is known in the art, the vibration transducer 52 may be a compression, annular shear, or other suitable style. The most appropriate type of transducer 52 will depend on the desired frequency response, sensitivity, and other parameters which may vary with intended operating environment. Those of skill in the art will be readily capable of selecting a transducer suitable for use in the handheld monitor described herein. It is most advantageous, of course, for the probe 23 to be tightly mechanically coupled to the transducer 52, and mechanically isolated from the housing 21 itself. Suitable methods of accomplishing these objectives will also be apparent to those of skill in the art.

Two electrical contacts to the transducer 52 are made, one of which comprises a circuit common 53 which is electrically tied to the metal probe 23 body. A second, signal electrical contact 54 is also made with the transducer 52 in a conventional manner. Both of these connections are connected to leads which route the analog electrical signal produced by the transducer 52 to the internal processing circuitry.

As shown in FIG. 3, the stud interface 80 also includes an electrical coupling 77 between the stud 14 and the monitor 20. One alternative configuration of this electrical coupling 77 is illustrated in FIG. 4. Thus, some embodiments of the present invention include a sleeve 56 made of a dielectric plastic material surrounding the probe 23 body. This dielectric sleeve 56 may in turn be surrounded by a conductive metal sleeve 58 which extends outside the housing 21 to a point short of the top of the threaded portion 50, thus creating another conductive contact near the probe. Internal to the housing 21, an electrical contact 60 is made to the outer sleeve 58. Thus, a coaxial type electrical structure may be created by the central probe 23 body, dielectric sleeve 56, and outer sleeve 58. This coaxial structure includes the circuit common 53 comprising the probe 23 body as described above and a second signal lead 62 internal to the housing 21, which is also routed to the processing circuitry inside the monitor 20. As will be explained further below, the above described structure is adapted to electrically connect circuitry internal to the handheld vibration monitor 20 with an electrical contact on the vibration coupling stud 14 so as to transfer data between the handheld vibration monitor 20 and integrated circuits (ICs) mounted in the vibration coupling stud.

Although a coaxial type structure is illustrated in FIG. 4, other methods of creating an electrical contact near the probe 23 tip are possible. For example, in one alternative embodiment illustrated in FIG. 5, the portion of the probe above the threaded section 50 is surrounded by a dielectric sleeve 57 which is provided with a metal ring 59 molded into the lower end of the dielectric sleeve, and having an exposed surface which forms the desired conductive contact. In this embodiment, a hole 61 may be provided longitudinally through the body of the sleeve so as to extend from inside the housing of the handheld vibration monitor to the top portion of the metal ring. A wire may be threaded through this longitudinal hole to connect to the metal ring 59 and which forms the signal connection 62.

Additional alternatives for creating the electrical portion of the stud interface 80 are illustrated in FIGS. 6A, 6B, 7A and 7B. In these embodiments, the probe 23a is formed so as to comprise a threaded receptacle 47, rather than as a plug as shown in FIGS. 1–5 As is best illustrated in the front views of FIGS. 6B and 7B, the receptacle 47 may have an oblong cross section similar to that shown for the plug style probe 23 of FIGS. 1 and 2A–2D. In this case, the stud 14 may comprise the mating plug portion, configured in a manner analogous to the probe 23 previously described, as is discussed below with reference to FIGS. 14A, 14B, 15A, and 15B. The rear end of the probe 23a forms a mount for the vibration transducer 52.

Figure 6A:
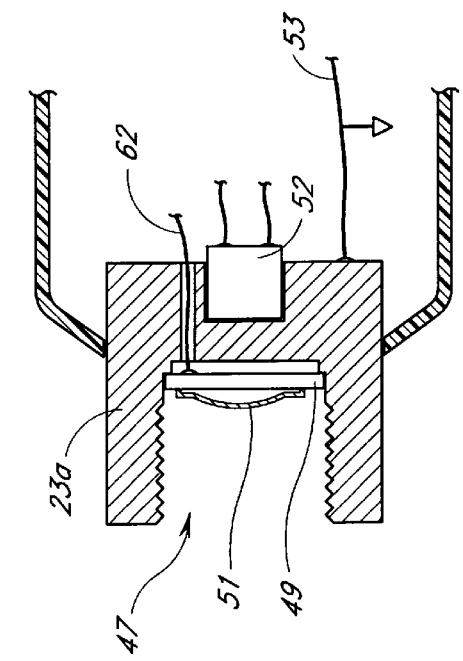
FIG. 6A is a cutaway side view of an alternative embodiment of a handheld vibration monitor.
Figure 6B:
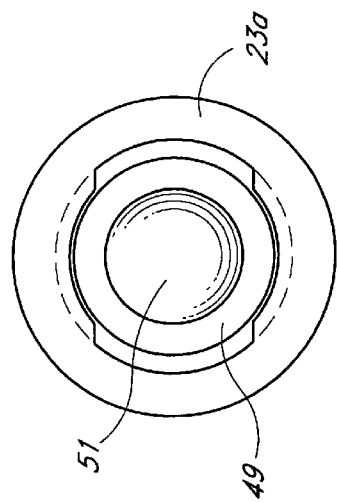
FIG. 6B is a front view of the monitor probe of FIG. 6A.
Figure 5:
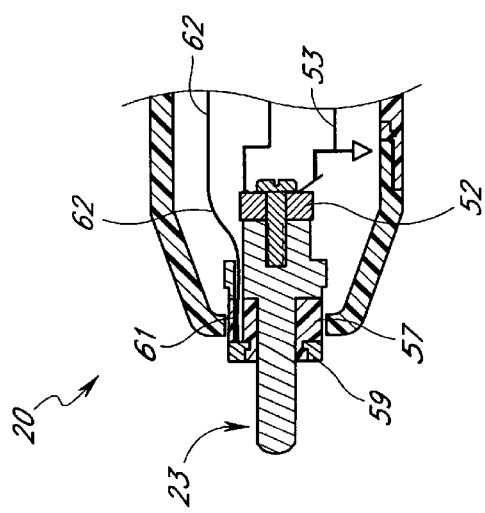
FIG. 5 is a cutaway side view of an alternative embodiment of a handheld vibration monitor.

As with the embodiments of FIGS. 4 and 5, the metal body of the probe 23a forms the ground connection 53 between the stud 14 and the vibration monitor 20. In the embodiment of FIGS. 6A and 6B, the signal connection is established by securing a printed circuit board 49 inside the receptacle 47 with epoxy adhesive or other mechanical fastening means. Soldered to the printed circuit board 49 is a resilient metal dome 51. Through a longitudinal hole in the probe 23a, the signal lead 62 that extends to the processing circuitry inside the monitor 20 is electrically connected to the dome 51, thus forming another electrical contact proximate to the probe 23 body. As will be explained further below, the dome 51 makes contact with a conductive pad or trace on a printed circuit board in an appropriately configured stud 14, such as the design illustrated in FIGS. 14A and 14B, to communicate with memory and/or other circuitry embedded in the stud 14.

Figure 7A:
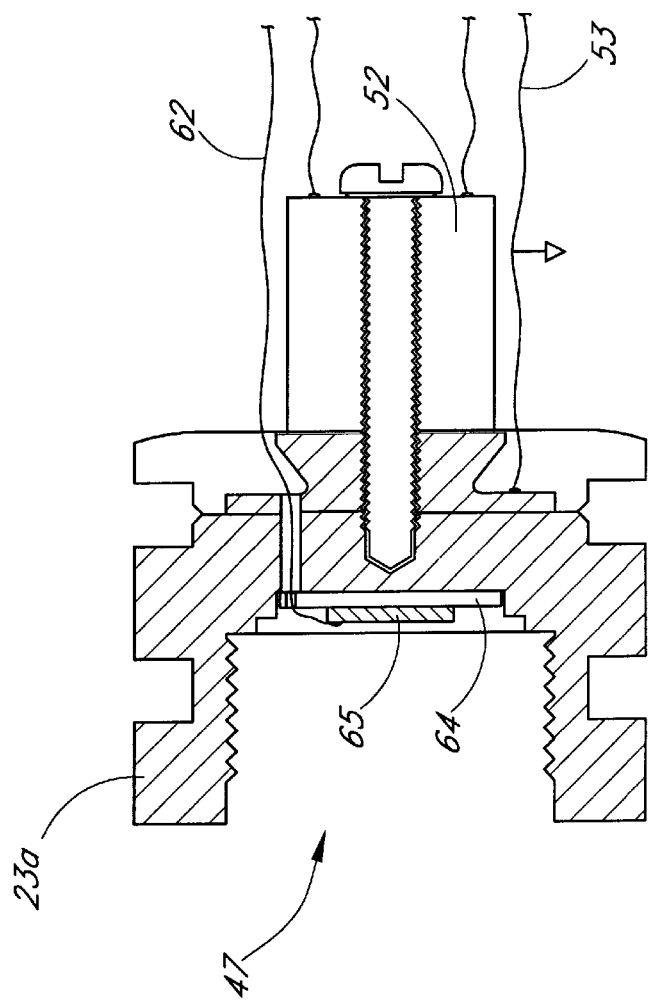
FIG. 7A is a cutaway side view of an alternative embodiment of a handheld vibration monitor.
Figure 7B:
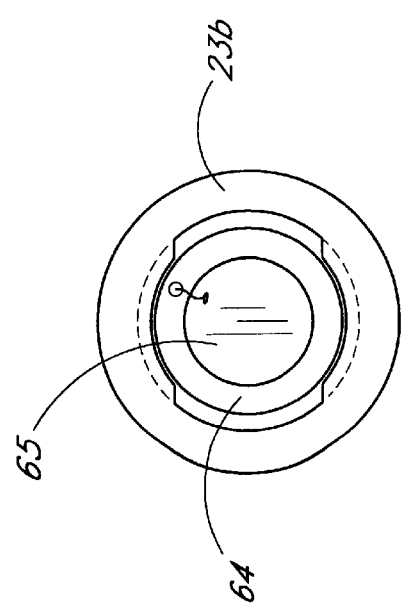
FIG. 7B is a front view of the monitor probe of FIG. 7A.

In the embodiment illustrated in FIGS. 7A and 7B, a resilient dome is not used. This embodiment is thus adapted to most advantageously interface with a stud that includes a resilient contact, as will be discussed in further detail below with reference to FIGS. 15, 16A and 16B. In this embodiment, an insulator 64 is affixed to the bottom of the receptacle 47, and a solid conductive contact 65 is secured to the insulator 64. The signal lead 62 may be threaded through a hole in the insulator 64 to electrically connect to the contact 65.

Figure 8A:
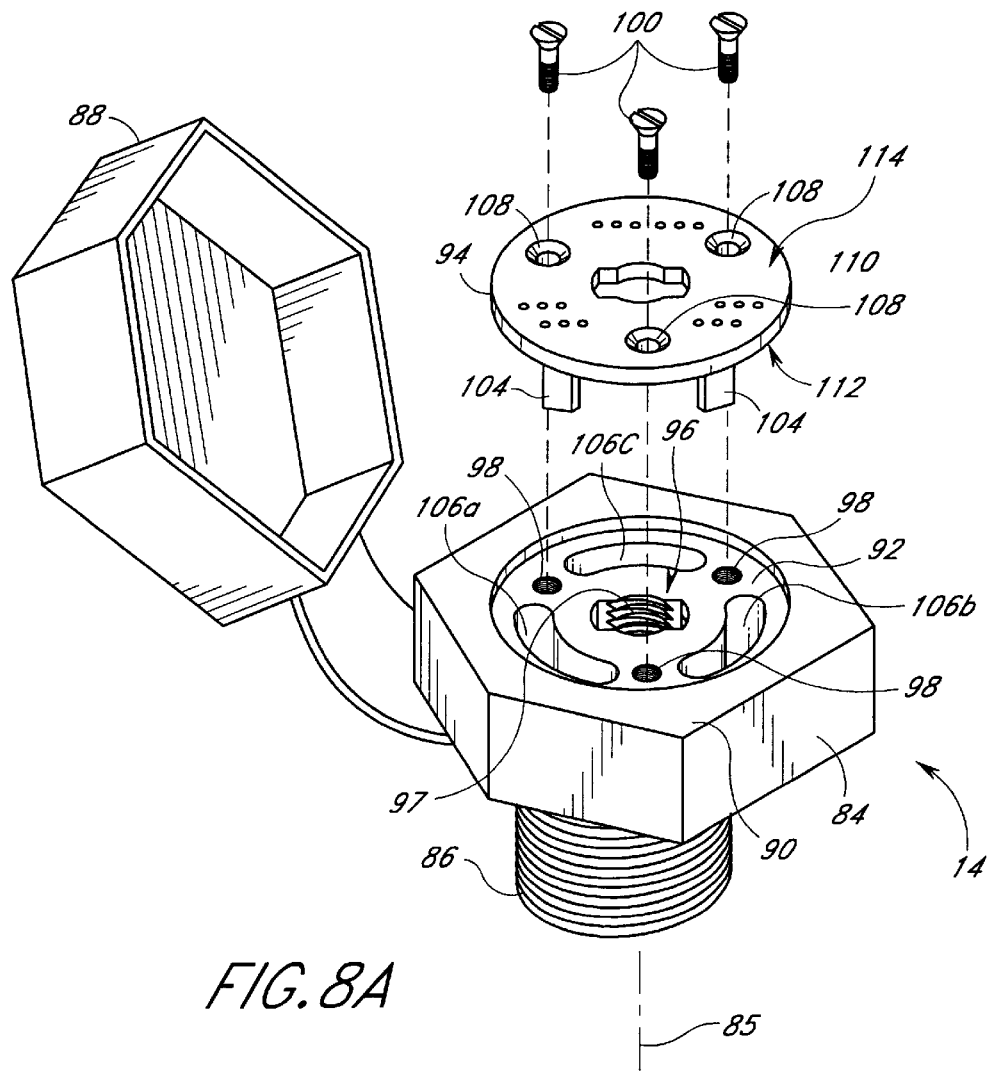
FIG. 8A is an exploded view of one embodiment of a vibration coupling stud in accordance with one aspect of the present invention.
Figure 8B:
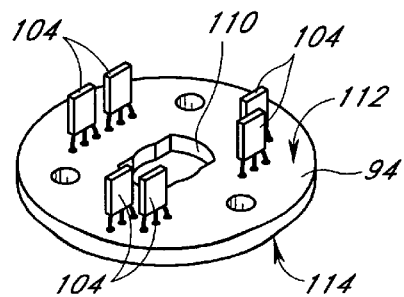
FIG. 8B is a perspective view of a printed circuit board adapted for installation in a vibration coupling stud.

One embodiment of a vibration coupling stud 14, which is especially adapted for use with the handheld vibration monitor 20 of FIGS. 1 through 5 is shown in FIGS. 8A and 8B. As is illustrated in the exploded view of FIG. 8A, one embodiment of an advantageous vibration coupling stud 14 includes a metal body comprising an upper hex-nut portion 84 and a lower threaded portion 86 extending therefrom along a central longitudinal axis 85 of the body of the stud 14. The lower threaded portion 86 is threadably installed into a bearing housing or machine enclosure, thereby attaching the stud to a machine measuring point when the stud is to be used as part of a vibration monitoring system. The vibration coupling stud may also include a rubber or plastic cover 88 for covering the stud 14 body when measurements are not being taken.

Preferably, the top surface 90 of the upper hex-nut portion of the vibration coupling stud 14 is machined to incorporate a recess 92 which is configured to mount a printed circuit board 94. To properly mate with the printed circuit board 94 and its components, the bottom of the recess 92 includes a plurality of cavities. One such cavity may comprise a centrally located probe receptacle 96. The probe receptacle 96 extends generally along the longitudinal axis 85 from the bottom surface of the recess 92 into the body of the stud 14. Opposed sides of the probe receptacle 96 are provided with threads 97 which engage with the threaded surfaces 25, 27 of the probe 23. It can be appreciated with examination of FIGS. 2 and 5A that the probe receptacle 96 is shaped to slidably accept the probe 23 with the flat surfaces 17, 18 of the probe 23 aligned adjacent to the threaded surfaces 97 inside the probe receptacle 96. A ¼ turn of the vibration monitor 20 (producing ¼ turn of the probe tip 23 as well) will then engage the threads 25, 27 on the probe 23 with the threads 97 in the probe receptacle 96. As will be described below in conjunction with FIG. 10, this ¼ turn solidly mates the probe 23 with the probe receptacle 96 when vibration measurements are to be taken.

As has also been mentioned briefly above, one or more integrated circuits ("ICs") 104 are soldered to the printed circuit board 94. In some embodiments, the ICs 104 are memory ICs for storing data concerning vibration measurements, alarm limits, bearing data, etc. In some advantageous embodiments of the present invention, the memory ICs have only two electrically active terminals, one comprising a signal terminal, and one comprising a ground terminal. Memory ICs which are suitable for use in some embodiments of the stud 14 of the present invention are commercially available, for example, as part number DS2430A from Dallas Semiconductor of Dallas, Tex. These devices include 256 bits of EEPROM memory which is serially written to and read from over the one signal terminal provided. These devices also include a 48 bit serial number so that individual memory ICs can be connected in parallel to a single signal line and addressed separately by an external device.

Furthermore, in other embodiments of the vibration coupling stud 14, one of the ICs soldered to the printed circuit board 94 may also comprise a electronic temperature sensor which has a digital output indicative of the temperature of the device. Preferably, the digital output is available serially over a single signal lead in a manner analogous to that described above with respect to the memory IC. Suitable temperature sensors of this nature are also commercially available from, for example, Dallas Semiconductor as part number DS1820. Additional types of transducers may also be incorporated into the stud. For example, vibration, current, flow, pressure, or speed sensors may be provided in addition to or as alternatives to the memory and temperature devices specifically described above.

As is illustrated in FIG. 8A, several tapped holes 98 for accepting printed circuit board mounting hardware 100 are also provided in the bottom of the recess 92, and the printed circuit board 94 is installed in the recess 92 in what would usually be considered upside down, with the ICs extending away from the printed circuit board 94 in a downward direction. In order to accommodate the vertical extension of the ICs 104 away from the bottom of the printed circuit board 94, the bottom of the recess 92 additionally comprises one or more hollow cavities 106a, 106b, 106c which are shaped and positioned to receive the ICs 104. Thus, when the printed circuit board 104 is installed in the recess 92, the tapped holes 98 are aligned with screw holes 108 in the printed circuit board 94, the probe receptacle 98 is aligned with a central aperture 10 in the printed circuit board 94, and the ICs 104 are aligned with the hollow cavities 106a, 106b, 106c respectively. The bottom surface 112 of the printed circuit board 94 thus rests flat on the bottom of the recess 92, with the top surface 114 of the printed circuit board 94 preferably below the level of the top surface 90 of the hex-nut portion of the stud 14 body. FIG. 5B illustrates the bottom side 112 of the printed circuit board, showing six ICs extending up from the board. It will be appreciated that the number of ICs provided will vary with the application and the amount of memory desired for the vibration coupling stud. For example, one advantageous embodiment includes one temperature sensor IC and one memory IC.

Figure 9A:
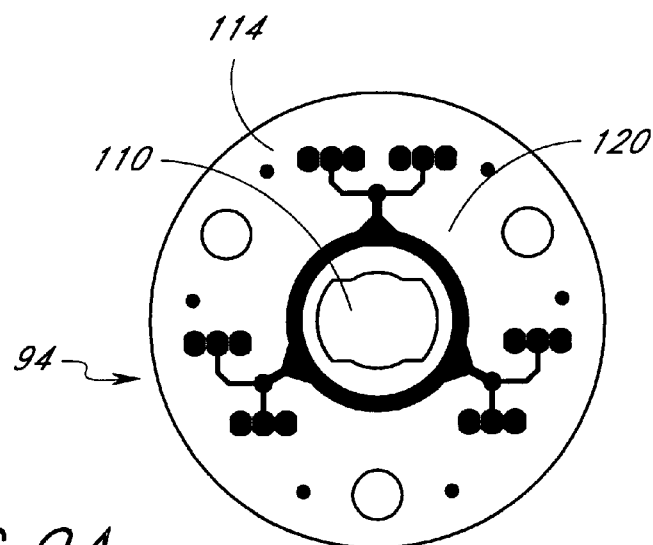
FIG. 9A is a top view of the printed circuit board of FIG. 8B.

Referring now to FIG. 9A, the printed circuit board 94 is further configured to electrically interface with the handheld vibration monitor 20 by including a trace 120 on its upper surface 114 which is not covered in solder mask, but instead comprises a bare metal contact point. If desired for corrosion resistance, the bare trace 120 may be coated with solder or be gold plated. In some advantageous embodiments, the trace 120 forms a ring around the central aperture 110. The trace is further electrically coupled to the signal pin of each IC 104 mounted to the printed circuit board 94.

Figure 9B:
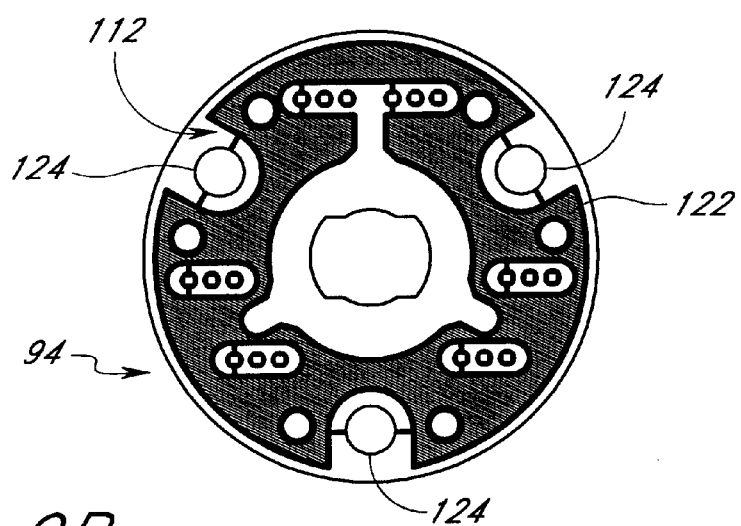
FIG. 9B is a bottom view of the printed circuit board of FIG. 8B.

As is shown in FIG. 9B, the bottom surface 112 of the printed circuit board 94 comprises a ground plane 122 which is electrically coupled to additional bare traces 124 surrounding the screw holes 108 in the printed circuit board 94. Also electrically coupled to the ground plane are the ground pins of each IC 104. When the printed circuit board 94 is installed in the recess 92 of the stud 14, the stud body makes electrical contact with the ground plane 122, and thus with the ground pins of the ICs 104.

Figure 10:
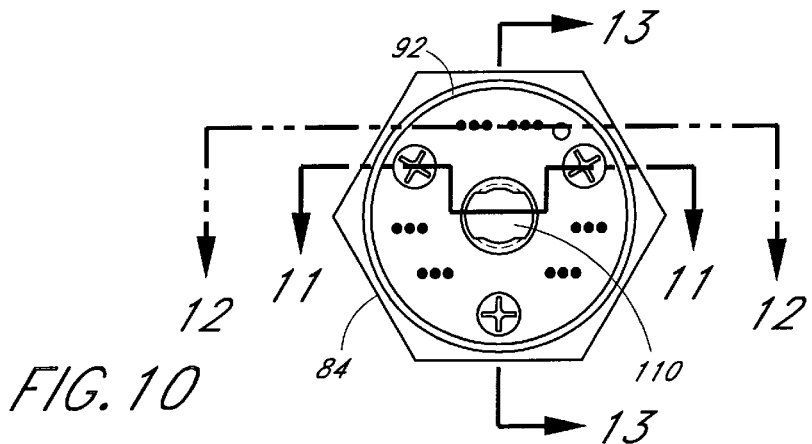
FIG. 10 is a top view of the vibration coupling stud of FIG. 8B with the printed circuit board installed.
Figure 11:
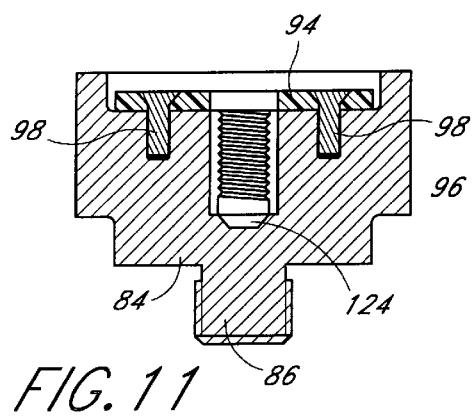
FIG. 11 is a cutaway side view along line 11—11 of the vibration coupling stud of FIG. 10.
Figure 12:
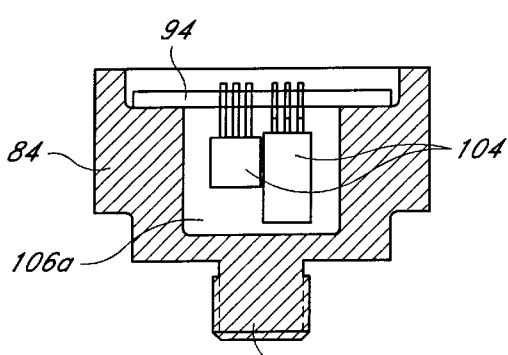
FIG. 12 is a second cutaway side view along lines 12—12 of the vibration coupling stud of FIG. 10.

The construction of the stud 14 is further illustrated in FIGS. 10 through 12. In FIG. 10, a top view shows the printed circuit board 94 mounted within the recess 92. FIG. 10 best illustrates the advantageous shape of the central aperture 110 in one embodiment of the stud 14. In this embodiment, the central aperture has an oblong shape conforming to the probe 23 cross section such that the probe flat sides 17, 18 (shown in FIGS. 1 and 2) must be aligned with those sides of the probe receptacle 96 which include the threads 97. After insertion of the probe 23 through the aperture 110, ¼ turn rotation forces the threads to engage so as to couple the probe 23 with the stud 14.

FIG. 11 illustrates a cutaway view along line 11—11 of FIG. 10, illustrating two of the screw holes 98 and the probe receptacle 96 formed inside the stud body. The bottom of the probe receptacle 96 may include a central depression 124 for accepting the tip of the probe 23 when the probe 23 is installed inside the stud 14, as will be described with reference to FIG. 13. FIG. 12 is a cutaway view along lines 12—12 of FIG. 10, and illustrates a cross section of hollow cavity 106a with the ICs suspended from the printed circuit board 94 above the cavity 106a. Although not illustrated in FIG. 12, when one of the ICs is a temperature sensor, the body of that IC may be placed in direct contact with the body of the stud 14, or the temperature sensor IC may fit snugly within a specially designed cavity filled with heat conducting grease or epoxy compound.

Figure 13:
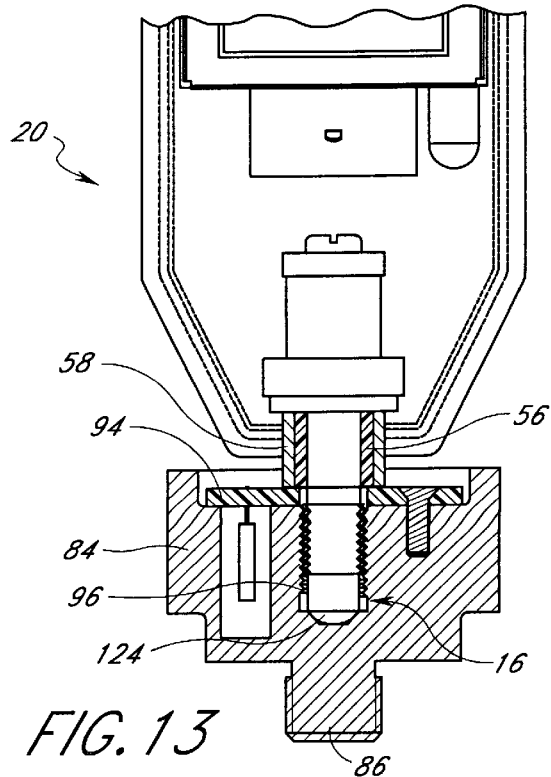
FIG. 13 is a cutaway side view along lines 13—13 of the handheld vibration monitor of FIG. 2 when interfaced with the vibration coupling stud of FIG. 10.

FIG. 13 shows the handheld vibration monitor 20 with its probe portion 23 inserted through the aperture 110 in the printed circuit board 94 and into the probe receptacle 96 and after the ¼ turn rotation which engaged the threads. The probe receptacle 96 is machined to a depth which makes the tip of the probe 23 press firmly against the base of the depression 124 when the probe threads 25, 27 are engaged to the probe receptacle threads 97. Therefore, when the probe 23 is rotated by ¼ turn after installation, thread engagement presses the tip of the probe 23 firmly into the depression 124 to produce a consistent and solid mechanical contact between the probe 23 and the stud body. It is advantageous for the interface between the handheld vibration monitor 20 and the stud 14 to remain in place with the user's hand removed from the monitor housing 21. This facilitates consistency over the course of many applications of the monitor 20 to the measuring point over the life of the machine.

Figure 14B:
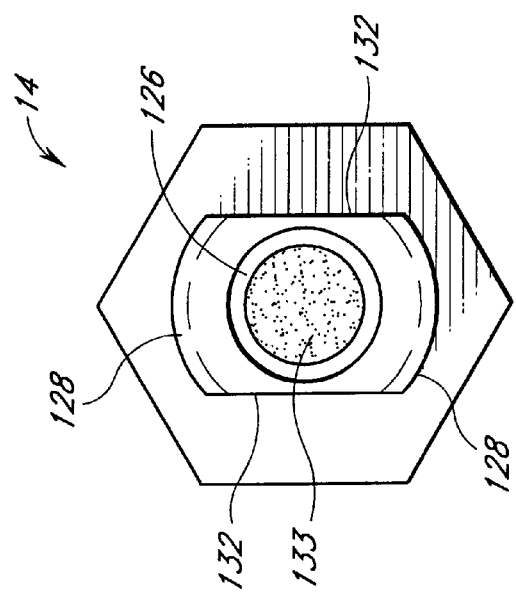
FIG. 14B is a top view of the vibration coupling stud of FIG. 14A.
Figure 14A:
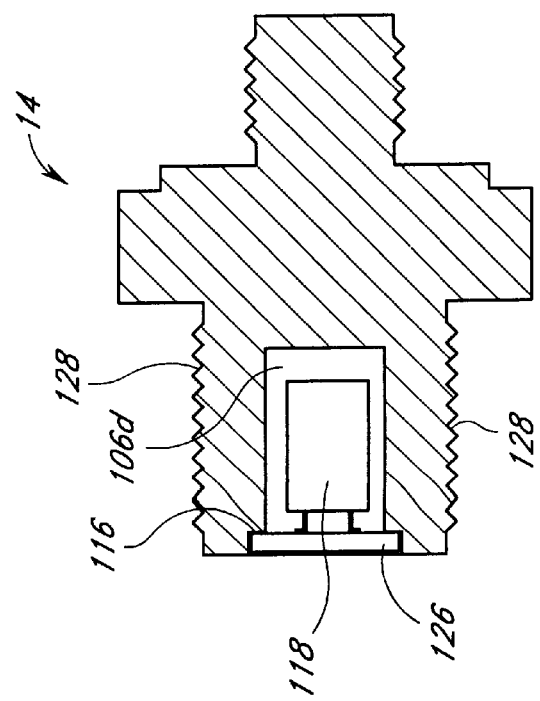
FIG. 14A is a cutaway side view of an alternative embodiment of a vibration coupling stud.

In FIGS. 14A and 14B, an alternative stud 14 embodiment is illustrated which is adapted to engage the probe 23a of FIGS. 6A and 6B. In this configuration, the stud 14 forms a plug which engages to the receptacle 47 of the probe 23a. The stud 14 comprises an approximately centrally located cavity 106d, which has an upper ledge 116 for receiving a printer circuit board 126. The printed circuit board 126 has one or more memory or other ICs 118 as described in detail above mounted to one side so as to extend into the cavity 116 when the printed circuit board 126 rests on the ledge. The ICs may be surface mounted to the board, and the IC/printed circuit board assembly may be held in place by placing epoxy into the cavity 106d, embedding the IC into the epoxy, and letting the epoxy set. In a manner analogous to that shown and described with respect to the probe 23 of FIGS. 1–2, this stud 14 embodiment may comprise double start threads 128 and opposed flat surfaces 132 so as to engage the probe 23a of FIGS. 6A and 6B with ¼ turn. It will be appreciated by those in the art that the stud may incorporate multiple start thread configurations other than the double start thread embodiment illustrated. These other multiple start thread configurations can allow probe 23 application to the stud 14 in more alternative orientations than the two orientations allowed in the specific double start embodiment illustrated. To form the electrical communication between the probe 23a of FIGS. 6A and 6B, the signal terminal of the ICs is connected to a pad or trace 133 (through a via if the ICs are surface mounted) on the outward facing surface of the printed circuit board 126. Also, the ground terminal of the ICs may be connected to a trace which is routed near the edge of the printed circuit board 126 so as to contact the ledge 116 of the stud 14, and to thereby connect the ground terminals of the ICs to the metal stud 14 body.

Figure 15:
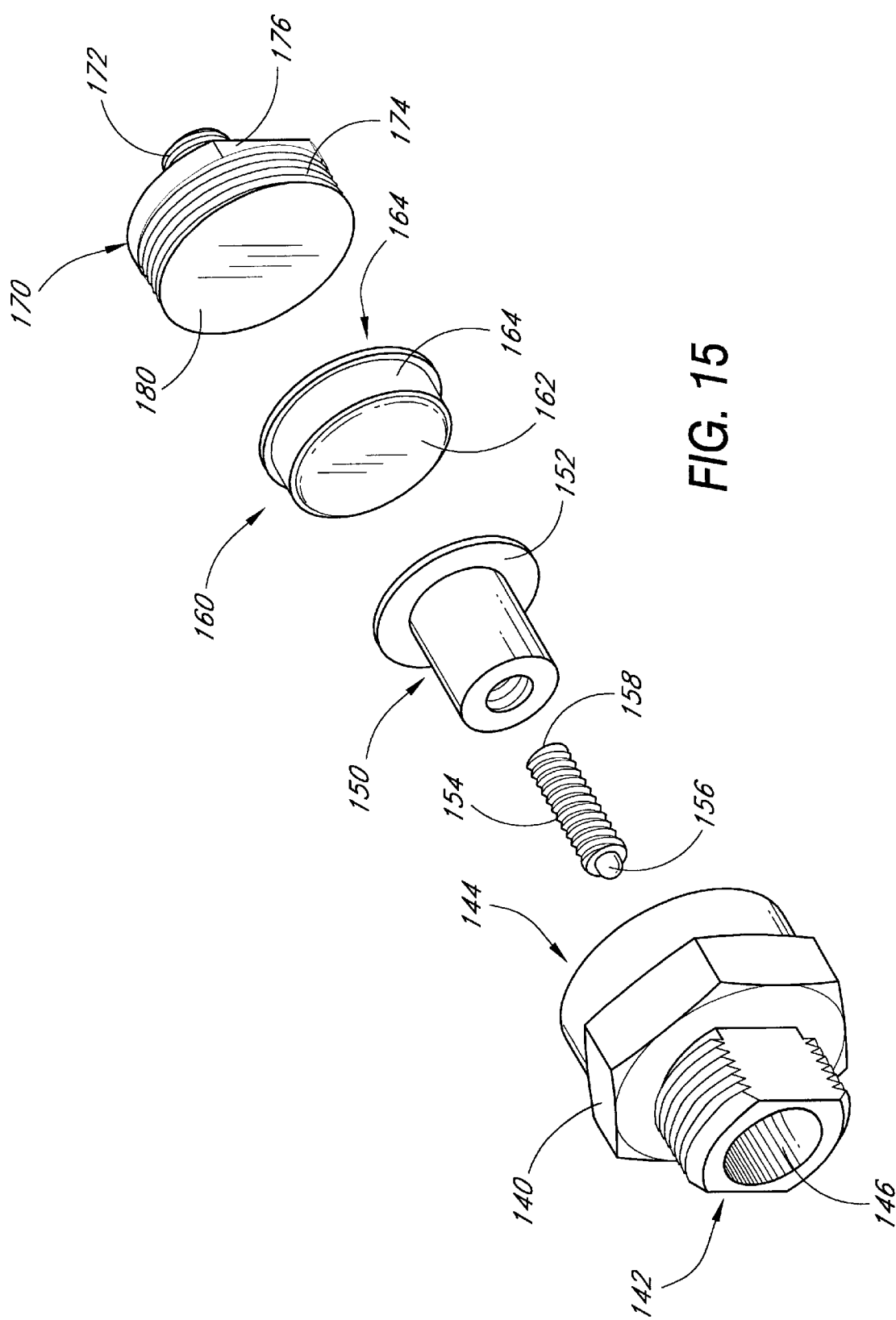
FIG. 15 is an exploded view of another embodiment of a vibration coupling stud.
Figure 16B:
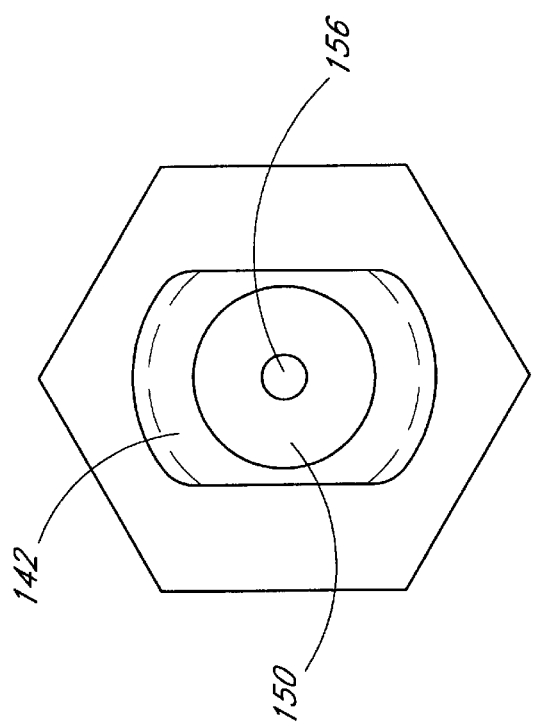
FIG. 16B is a top view of the vibration coupling stud of FIG. 16A.
Figure 16A:
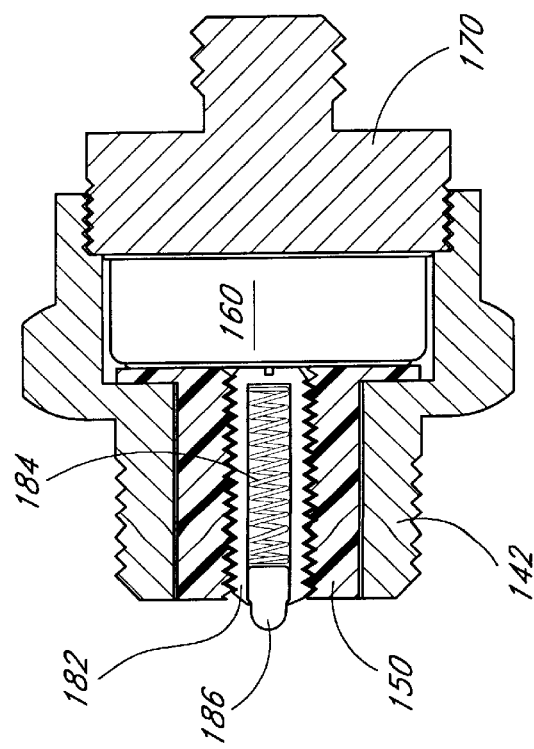
FIG. 16A is a cutaway side view of the vibration coupling stud of FIG. 15 after assembly.

A further advantageous stud embodiment is illustrated in FIGS. 15, 16A and 16B. This embodiment is designed to couple to the vibration monitor interface illustrated in FIGS. 7A and 7B. The stud embodiment illustrated in these Figures has some similarities to the embodiment illustrated in FIGS. 14A and 14B. In both of these embodiments, the stud forms a plug (or male end) which mates to a receptacle (or female end) on the vibration monitor. In addition, in both of these embodiments, an electronic circuit which may include a memory and/or digital temperature elements in the stud is subtantially surrounded by components of the stud structure.

Referring now to FIG. 15, the stud comprises a first body portion 140 which includes a vibration monitor coupling point 142. As is also described above with respect to other stud embodiments, the vibration monitor coupling point 142 advantageously comprises flats and double start threads for ¼ turn connection between the vibration monitor and the stud. As described above, other multiple start thread configurations may alternatively be provided. The first body portion 140 also includes a recess or cavity 144 (hidden from view in FIG. 15) on one end, and a hole 146 which extends from the top of the vibration monitoring attachment point 142 to the recess 144.

An insulating sleeve 150 is mounted within this hole 146. The insulating sleeve 150 may be slid up through the hole 146 via the recess 144 in the end of the first body portion until a flange 152 on the sleeve 150 abuts the bottom of the recess 144. The insulating sleeve 150 itself includes a central throughbore 155, in which a threaded electrical contact 154 may be mounted. The electrical contact 154 is sized such that one end 156 extends slightly past the top of the insulating sleeve 150, while the other end 158 extends slightly beyond the bottom of the flange 152. Thus, the electrical contact 154 is isolated from the first body portion 140 by the sleeve 150, and has one end 158 accessible for contact with an electronic circuit element 160 which may comprise a memory, a digital temperature device, etc., as described below. The electronic circuit element 160 may be loaded into the recess 144 after the sleeve 150 and contact 154.

The circuit element 160 is advantageously of a "can" configuration having a single data input/output terminal and a ground terminal. This physical configuration is common for small batteries for example, and is also available commercially for memory and digital temperature elements from, for example, Dallas Semiconductor. In this configuration, a data input/output terminal 162 is located at a top surface of the device 160. Furthermore, the bottom and sides of the device form a common or ground terminal 164. Electrical isolation is provided by sizing and mounting the data input/output terminal 162 such that it does not contact the side or bottom surfaces of the device. The circuit element 160 may include one or both memory storage and temperature sensing capabilities or may have any combination of capabilities as described above in conjunction with FIG. 8.

After the circuit element 160 is loaded into the recess 144, it may be clamped in place by a second stud body portion 170 which is engageable with the first body portion 144. The second body portion may comprise a machine attachment point 172. The engagement may be made by many different methods including friction, detents, etc. In one embodiment, the recess 144 is internally threaded, and the second body portion 170 is provided with external threads 172 for threadably engaging the first body portion 140. In this embodiment, the second body portion 170 may include opposed flats 176 for engagement with a wrench. When the first body portion 140 and the second body portion 170 are engaged, a flat surface 180 on the second body portion advantageously presses against the ground terminal 164 of the circuit element 160, and forces the data input/output terminal 162 against the end 158 of the electrical contact 154. Thus, the data input/output terminal 162 of the circuit element 160 is available for data transfer outside the stud body, and the ground terminal 164 of the circuit element 160 is electrically coupled to the stud body portions 140, 170, which will generally be made of metal.

FIGS. 16A and 16B illustrate the stud of FIG. 15 after assembly. The cross section of FIG. 16A illustrates the second body portion 170 contacting the bottom of the circuit element 160 and the top of the circuit element 160 (which comprises the data input/output terminal 162) contacting the electrical contact 154, which is mounted inside the insulating sleeve 150. Also illustrated in FIG. 16A is a cross section of the electrical contact 154. As illustrated in this Figure, the contact 154 may advantageously comprise a hollow housing 182 with a spring 184 mounted inside. The spring 184 presses against a plunger 186 which is received by the hollow housing 182. As will be explained in more detail with reference to FIG. 17, the plunger provides a resilient electrical connection between the stud and the vibration monitor. For improved electrical contact between the contact 154, the circuit element 160, and the vibration monitor, the contact housing 182 and plunger 186 may be plated with gold, rhodium, gold/rhodium alloy, or other high conductivity metal coating.

It will be appreciated that the stud embodiment illustrated in FIGS. 15, 16A, and 16B includes many desirable features. In addition to inexpensive manufacture, the design allows replacement and upgrades of the circuit element 160 to be performed by users themselves, eliminating the need to dispose of an entire stud when additional memory, new features, etc. are desired or when there are malfunctions in the circuit element 160.

Figure 17:
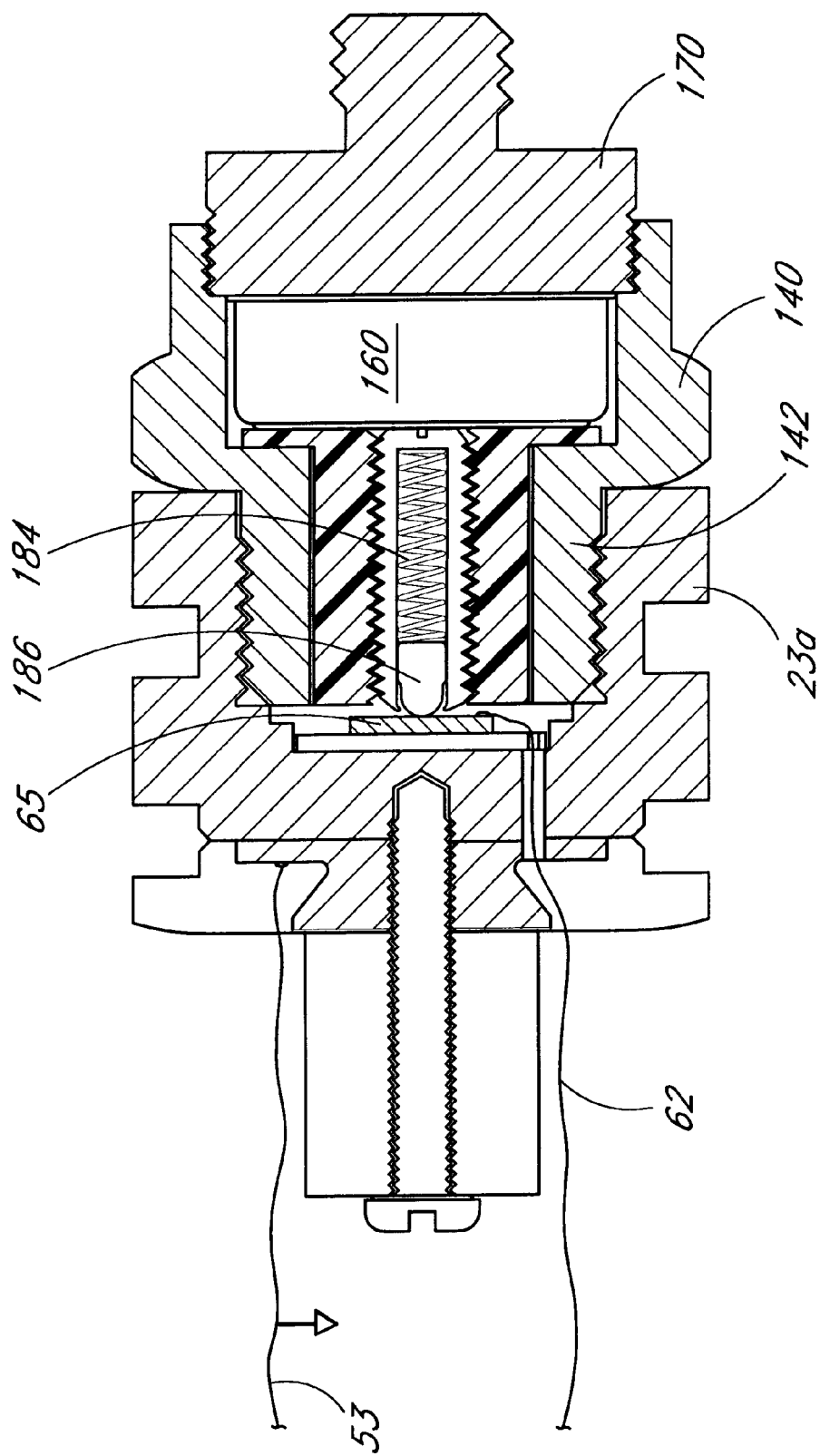
FIG. 17 is a cutaway side view of the handheld vibration monitor of FIGS. 7A and 7B when interfaced with the vibration coupling stud of FIGS. 16A and 16B.

FIG. 17 illustrates the vibration monitor probe receptacle 23a of FIGS. 7A and 7B coupled to the vibration monitor coupling point 142 of the stud embodiment of FIGS. 15, 16A and 16B. In analogy to the other embodiments described above, engagement is initiated with a ¼ turn of the vibration monitor. This presses the plunger 186 against the contact 65, and compresses the spring 184 to provide an effective electrical contact between the two elements for data transfer between the circuit element 160 and the vibration monitor.

In some embodiments of the present invention, therefore, the formation of a mechanical connection between the probe 23 or 23a tip and the stud 14, an electrical contact is also formed between the probe 23 or 23a and the metal stud body. Furthermore, an additional electrical contact 58, 59, 51, 65 creates an electrical connection with the bare trace, pad, or other electrical contact 120, 133, 186 mounted on the stud. In this way, the circuit common 53, and the second signal lead 62 inside the handheld vibration monitor 20 are connected to the ground and the signal terminals of the ICs, thus forming a data communication link between the ICs and the processing circuitry inside the handheld vibration monitor 20.

Figure 18:
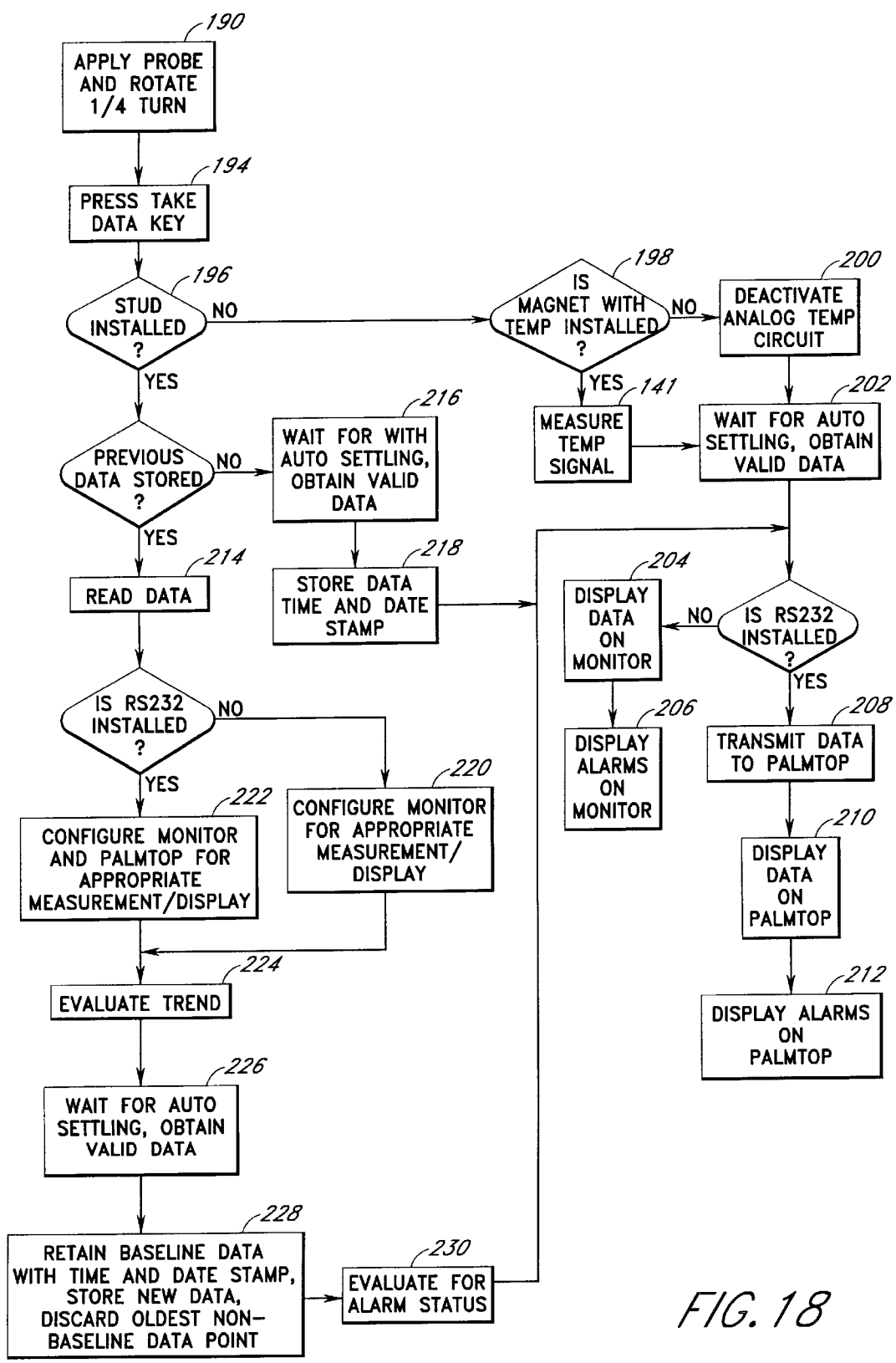
FIG. 18 is a flowchart of operational steps performed by a vibration monitoring system according to one embodiment of the present invention.

Once this electrical and mechanical communication is established, the user can perform a wide variety of data acquisition and data storage functions. A flow chart illustrating one possible sequence for data acquisition and storage is presented in FIG. 18. The first step to data collection, shown at 190 in FIG. 18, is applying the probe 23 or 23a to the stud 14 and rotating the monitor 20 by ¼ turn to engage the threads on the probe with the threads on the stud. As discussed above, this engagement also creates a connection between the vibration monitor 20 and a pad or trace on the surface of a printed wiring board mounted on the stud. At step 194, one of the two "TAKE DATA" keys discussed above is pressed. It may be noted that some stud embodiments may be temporarily magnetically coupled to the machine being monitored rather than permanently mounted. These magnetic studs will generally not include memory storage for data regarding one particular measuring point, because they will be used at many different measuring points. However, a magnetically coupled stud may still advantageously include a temperature sensor with an analog electrical output indicative of temperature. The circuitry in the handheld vibration monitor 20 is therefore preferably configured to automatically sense the presence or absence of memory ICs. Thus, at step 196, circuitry in the handheld vibration monitor 20 checks for communication with embedded memory devices to determine if the stud being used is a permanently mounted configuration having a memory for storing information relevant to the measuring point. If no memory devices are sensed, at step 198 the handheld vibration monitor 20 looks for an electrical signal from an analog temperature sensing device. If no analog temperature signal is sensed, at step 200 the analog temperature sensing circuitry is deactivated, and at step 202 the analog signal from the vibration transducer 52 is monitored. Alternatively, if an analog temperature signal is detected, the monitor 20 determines the temperature at the measuring point at step 201.

The circuitry inside the vibration monitor 20 then analyzes the signal output from the transducer 52 at step 202. In some embodiments, an automatic settling routine is run during vibration data collection. This ensures that the vibration signal is stable before it is compared to alarm limits or displayed on the display 26 of the monitor 20. In one automatic settling routine, the rate of change of the RMS signal output from the transducer 52 is monitored by comparing RMS values taken at regular intervals. If the difference between successive RMS values is less than some predetermined fraction of the latest RMS value measured, the reading is considered valid, and is made available for further processing and display. Of course, other signal analysis techniques to determine whether or not the signal being received is settled and is not fluctuating excessively due to a poor contact or other problem will be apparent to those of skill in the art, and the specific method used may vary widely while providing the useful "signal OK" determination. It is beneficial, however, to include this initial signal monitoring which requires no user action or judgement to determine if the incoming signal appears to be a valid measurement.

After determining that the signal has the characteristics of a valid, stable signal, the signal is processed to produce velocity data or more complex vibration signal parameters. One or more of these values may then be compared to alarm limits for the measured parameters. Typically, the handheld vibration monitor 20 has default alarm limits stored in the internal memory 74. Preferably, however, these default values may be overridden by point specific alarm limits uploaded from the memory chips 104 in the stud 14 as will also be described below. At steps 204 and 206, the measured value and any required alarms may then be displayed on the handheld vibration monitor 20. Alternatively, if an RS-232 communication to a palm-top processor 22 is present, data may also be downloaded to the processor 22 at step 208. The processor 22 may then perform additional analysis, and may also display data and present necessary alarm to the user at steps 210 and 212.

At step 214, if a stud containing memory IC's is present, the handheld vibration monitor 20 will upload the data which is available. This data may include a unique or quasi-unique point identification code to specifically identify the point in the facility the monitor 20 is connected to. It may also include point specific alarm levels for vibration parameters such as acceleration or velocity as well as alarm limits for more complex frequency and amplitude analyses of the vibration spectrum. Other types of data may also be stored in the stud IC memory such as bearing part or model number, factory measured bearing quality characteristics, lubrication data, when the bearing was installed, appropriate measurement setup such as filtering parameters, a list of vibrational frequencies indicative of bearing defects, rotational speed, as well as others. As bearing housing temperature is an important parameter in addition to the various forms of vibration data, the stud 14 may include an integral digital temperature sensor IC as set forth above, and therefore digital temperature data may also be retrieved at step 214. As will also be described below, the data stored in the stud may additionally comprise prior time and date stamped vibration and temperature measurements made at that measuring point.

If no data has been stored in the stud, and no temperature data is available, the circuitry inside the vibration monitor 20 then waits for a stable signal output from the transducer 52 at step 216 as has been described with reference to step 202. After the measurement has been made, the measurement is stored at step 218 in the stud 14 by the monitor 20 over the electrical interface to the ICs. In some advantageous embodiments, the measurement is stored in association with the date and perhaps also the time that the measurement was taken. When no prior data is stored in the stud, this initial measurement is preferably tagged as a baseline measurement, which is used to compare with future measurements to evaluate the presence of defects and other alarm conditions which are revealed by changes from the baseline measurement. Then, the monitor moves to the data and alarm display steps 204, 206, 210, 212 discussed above.

Depending on whether or not the monitor 20 is interfacing with a palm-top processing unit 22, any data retrieved from the stud at step 214 is used to configure either the monitor alone at step 220 or both the monitor 20 and palm-top processor 22 at step 222 for display and alarm parameters which are appropriate to the measuring point. At step 224, if a series of prior measurements are stored in the stud 14, the monitor or palm-top processor evaluates the trend around or away from the baseline measurement initially taken and stored in the stud using procedures for vibration data analysis which are well known in the art. Following this retrieval and analysis of prior data, the monitor 20 analyzes the transducer signal at step 226, waiting for a valid reading as described above with reference to steps 202 and 216. At step 228, the latest measurement taken at step 226 is stored in the stud IC memory. In some advantageous embodiments, a first-in, first-out (FIFO) series of data points are stored in the stud. Once the FIFO stack is full, new entries force the oldest entry out. However, the entry tagged as the baseline entry will be retained. Storing such a historical record of measurements in the stud itself can be useful in watching trends over time in the measured parameters. When the prior measurements are stored in the stud 14, a significant or dangerous difference between the current measurement and past measurements can be spotted immediately, without requiring the value to be first downloaded to a host computer which stores the past measurement data. In some embodiments, the decision of whether or not to store the measured data in the stud is made by the user, while in other alternative embodiments, the handheld vibration monitor 20 automatically stores the measured value in the stud 14 memory without additional user interaction. At step 230 then, the new measurement and stored trend are evaluated for the generation of alarms to the user, and the system enters the data and alarm display steps 204,206,210,212.

It is generally advantageous to store at least the date the measurement was taken in association with the measurement itself. It can be appreciated that this information would often be useful in evaluating the significance of changes in vibration measurements at different data acquisition times. In some embodiments, only one measurement per day will be stored, and any further measurements taken on that day will overwrite the previously made measurement. This allows a user to conveniently overwrite a previous entry if the user suspects that bad data was gathered at that point earlier in the day. After these operations are complete, the user removes the probe.

It may also be desirable to add or alter bearing parameters, alarm limits, and other information stored or storable in the memory of the vibration coupling stud 14. In many advantageous embodiments of the present invention, the creation or revision of alarm limits, severity matrices, configuration data, etc. stored in the stud at the measuring point is tightly controlled by a host computer system. In advantageous embodiments, the host system will interface with the palm-top processor 22 and download any new alarm limits, or other new or revised data to be stored in the stud 14. The host system may also instruct the monitor 20 to store the new parameters in the stud 14 during the next monitor/stud connection. This writing process may be contrasted with the process of storing date stamped vibration measurements in the stud 14, which preferably can be accomplished with the monitor 20 alone, without any monitor 20 interface to the palm-top processor 22 or host system intervention.

The vibration monitoring system of the present invention thus provides several advantages over prior art vibration monitoring systems. A wide variety of information about the machine, bearing, or other device being monitored can be stored in the vibration coupling stud. This information is easily retrievable and alterable during routine vibration data acquisition. Temperature data may also be retrieved from the stud itself. The handheld vibration monitor is configured to promote a consistent mechanical coupling and stable output reading with each application of the monitor to a measuring point. In addition, the handheld vibration monitor may download various forms of vibration data in a digital format which is consistent with industry standard communication protocols and hardware. This allows standard, commercially available palm-top computers to be used with the handheld vibration monitor. Thus, users need only run appropriate software on palm-tops they already own or choose themselves, and do not need separately acquire palm-top computers having hardware dedicated to interfacing with the handheld vibration monitor.

The foregoing description details certain preferred embodiments of the present invention and describes the best mode contemplated. It will be appreciated, however, that no matter how detailed the foregoing appears in text, the invention can be practiced in many ways. As is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated. The scope of the present invention should therefore be construed in accordance with the appended claims and any equivalents thereof.

What is claimed is:

1. A vibration coupling stud having a body comprising an internal recess, said recess containing an electronic circuit element such that said body substantially surrounds said electronic circuit element, wherein said stud comprises first and second engageable portions which clamp said electronic circuit element in said recess when said portions are engaged.

2. The vibration coupling stud of claim 1, wherein said first engageable portion comprises a vibration monitor coupling point, and wherein said second engageable portion comprises a machine attachment point.

3. The vibration coupling stud of claim 2, wherein said vibration monitor coupling point comprises multiple start threads.

4. The vibration coupling stud of claim 1, wherein said first and second engageable portions are threadably engaged.

5. The vibration coupling stud of claim 1, wherein said electronic circuit element comprises a input/output terminal and a ground terminal.

6. The vibration coupling stud of claim 5, additionally comprising an electrical contact having one end in contact with said input/output terminal and another end extending through said first engageable portion.

7. The vibration coupling stud of claim 6, wherein said second engageable portion is in contact with said ground terminal.

8. The vibration coupling stud of claim 7, wherein said first engageable portion comprises a vibration monitor coupling point, and wherein said second engageable portion comprises a machine attachment point.

9. A vibration coupling stud comprising first and second engaged body portions and an internal recess, said stud additionally comprising an electronic circuit element clamped between said first and second body portions and captured in said internal recess.

10. The vibration coupling stud of claim 9, wherein said first engageable portion comprises a vibration monitor coupling point, and wherein said second engageable portion comprises a machine attachment point.

11. The vibration coupling stud of claim 10, wherein said vibration monitor coupling point comprises multiple start threads.

12. The stud of claim 9, wherein said first and second body portions are threadably engaged.

13. The stud of claim 9, wherein said electronic circuit element comprises a ground terminal, and wherein said ground terminal, said first body portion, and said second body portion are electrically connected.

14. A method of making a vibration coupling stud comprising:

forming a recess in a first body portion;

placing an electronic circuit element in said recess;

engaging a second body portion to said recess over said electronic circuit element such that said electronic circuit element is clamped between said first and second body portions and captured in said internal recess.

15. The method of claim 14, additionally comprising forming a vibration monitor coupling point in said first body portion and forming a machine attachment point in said second body portion.

16. The method of claim 14, additionally comprising forming a longitudinally extending hole in said first body portion, said longitudinally extending hole extending from a first end of said first body portion to said recess.

17. The method of claim 16, additionally comprising: placing a longitudinally extending electrical contact in an insulating sleeve; placing said insulating sleeve into said longitudinally extending hole such that said electrical contact touches said electronic circuit element.

18. A vibration coupling stud comprising:

a first body portion having a vibration monitor coupling point formed at a first end and a recess formed at a second end, said first body portion further comprising a hole extending from said vibration monitor coupling point to said recess;

an insulating sleeve mounted in said hole;

an electrical contact extending through said insulating sleeve having a first end proximate said vibration monitor coupling point and a second end proximate said recess;

an electronic circuit element comprising an input/output terminal and a ground terminal, said electronic circuit element being mounted in said recess such that said input/output terminal touches said second end of said electrical contact;

a second body portion engaged with said recess formed in said first body portion such that said second body portion touches said ground terminal of said electronic circuit.

19. The stud of claim 18, wherein said second body portion additionally comprises a machine attachment point.

20. The stud of claim 18, wherein said second body portion is threadably engaged with said first body portion.

21. The stud of claim 18, wherein said electronic circuit element comprises a memory integrated circuit.

22. The stud of claim 18, wherein said electronic circuit element comprises a digital temperature sensor.

* * * * *